3,189,047
PNEUMATIC LOCKOUT RELAY FOR ENGINE
SAFETY CONTROL SYSTEM OR THE LIKE
Louis M. Puster, Knoxville, Tenn., assignor to Robertshaw Controls Company, Richmond, Va., a corporation of Delaware
Filed Mar. 11, 1963, Ser. No. 264,113
3 Claims. (Cl. 137—614.21)

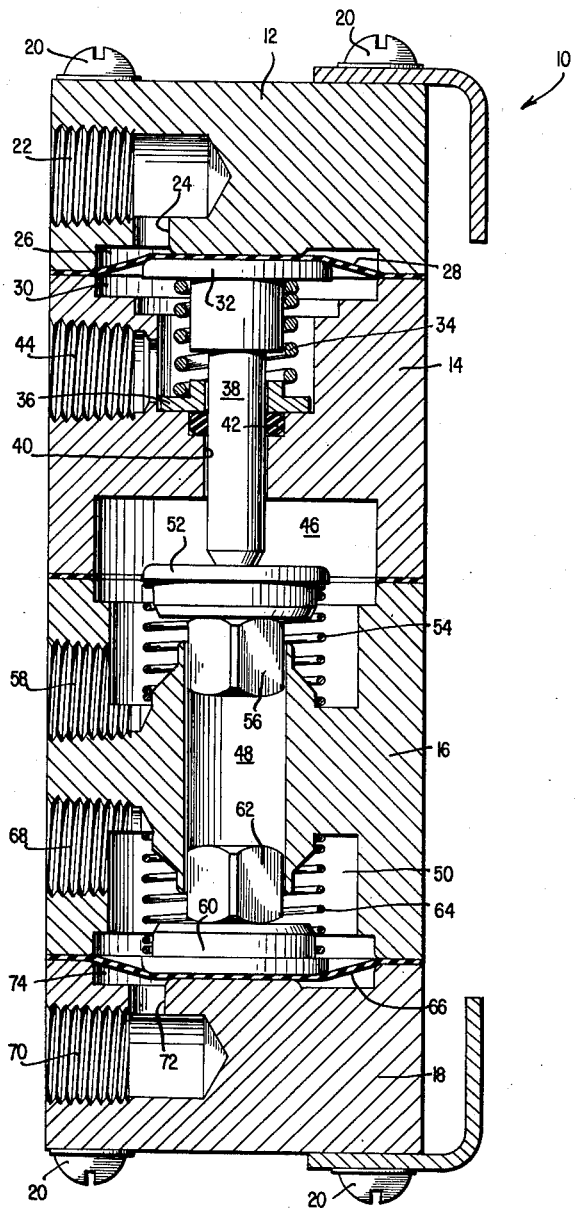

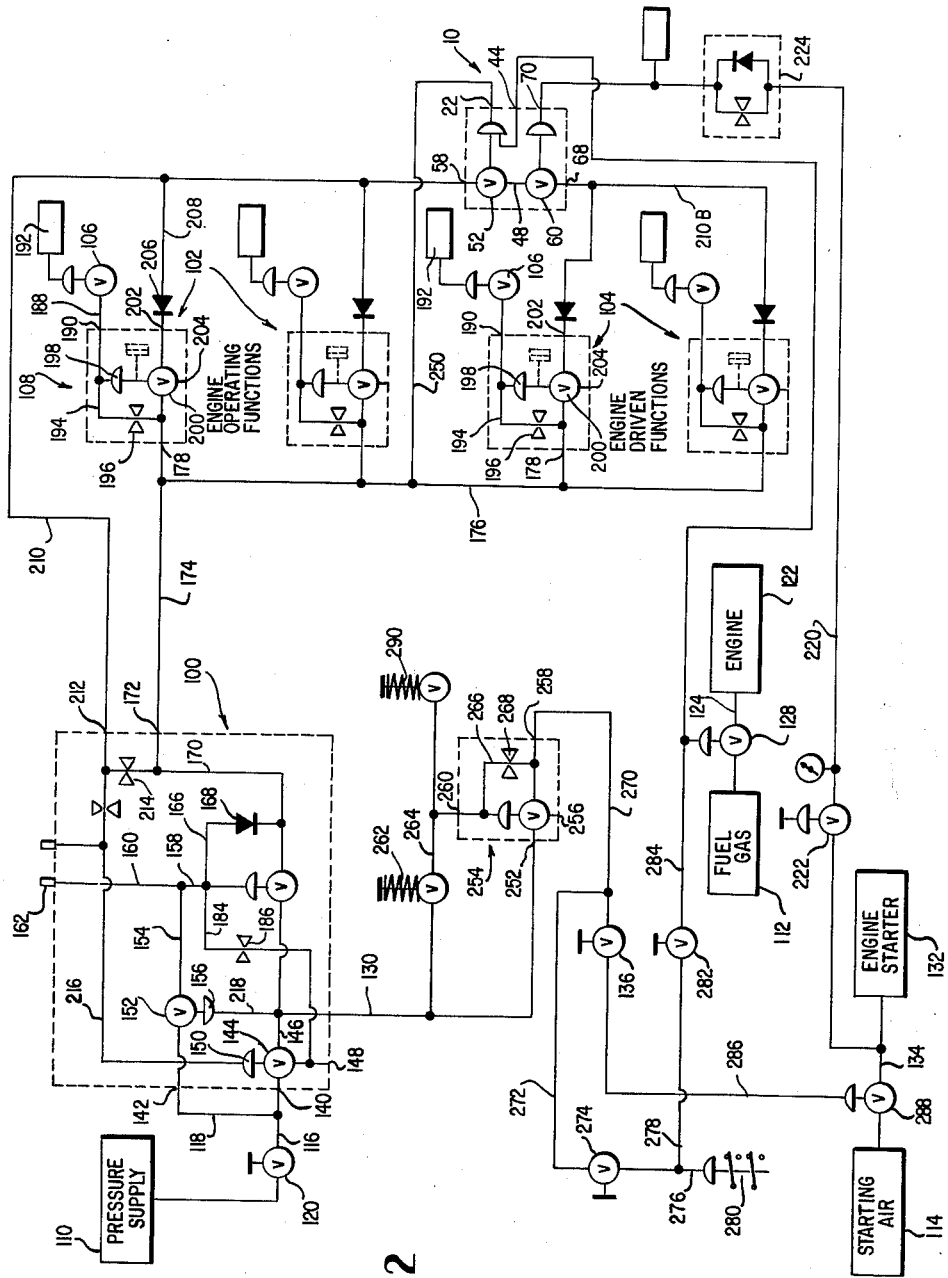

This invention relates to pneumatic relays employed in pneumatic control systems, and more particularly to relays employed to temporarily isolate a selected portion of a pneumatic control circuit from other portions of the circuit.

One example of a system in which the present invention is useful is a pneumatic safety control system of the type employed to monitor prime movers or engines which are infrequently or only intermittently attended to stop operation of the engine in the event of the existence of an unsafe or abnormal condition. In many systems of this type, it is necessary or desirable to employ the system to monitor not only Class A or engine operating conditions, such as bearing temperature, engine vibration, etc., but also to monitor Class B or engine driven conditions such as shaft speed, output pressure of an engine driven pump, etc. One basic difference between Class A and Class B conditions is that Class A conditions, such as engine bearing temperature, for example, are within a safe or normal range when the engine is stopped, while Class B conditions, such as an engine driven pump output pressure, are in an "unsafe" or abnormal condition when the engine is stopped. Thus, during the starting of an engine, it is necessary to temporarily isolate Class B condition monitoring devices from the safety control system until the engine has had a chance to come up to normal operating speed to place the Class B conditions in their "safe" or normal operating range.

It is a major object of the present invention to provide a pneumatic lockout relay which is operable to automatically isolate a selected portion of a pneumatic control circuit from other portions of the circuit during a temporary abnormal operation, such as during the starting of an engine controlled by the control circuit, and to connect the isolated portion into the circuit when normal operation is achieved.

The foregoing, and other objects, are achieved in a lockout relay in which two ports are connected within the relay by an internal passage. A chamber is formed within the relay at each end of the passage and within each of the chambers a valve head is supported for movement toward and away from the opening of the passage. One of the chambers is divided into two portions by a diaphragm operable to shift the associated valve head into and out of engagement with its seat, while the other of the valve heads is operated by a valve stem controlled by a diaphragm mounted in a separate chamber. Additional ports are provided in the valve to control operation of the respective diaphragms.

Operation of the lockout relay is dependent primarily in the manner in which it is connected into the pneumatic control system and an exemplary control system is described in detail below.

Other objects and features of the invention will become apparent from reference to the following specification and to the drawings.

In the drawings:

FIG. 1 is a longitudinal cross-sectional view through a lockout relay embodying the present invention, and FIG. 2 is a schematic diagram of an engine safety control system employing the lockout relay of FIG. 1.

*Lockout relay of FIG. 1*

The lockout relay of FIG. 1 includes a housing designated generally 10 which is constructed from four metallic blocks 12, 14, 16 and 18 which are secured to each other in assembled relationship as by screws 20. Each of the metallic blocks is bored in a manner described in more detail below so that when the blocks are cooperatively assembled as shown in FIG. 1, various internal chambers and passages are cooperatively defined in the interior of housing 10.

Upper block 12 is formed with a top port 22 intersected by a passage 24 which places port 22 in communication with the upper portion of a chamber 26 cooperatively defined in the lower portion of block 12 and the upper portion of block 14. Chamber 26 is divided into an upper and lower portion by a flexible diaphragm 28 which also serves as a gasket to provide an airtight seal between the mating surfaces of blocks 14 and 12. In the lower portion 30 of chamber 26, a diaphragm engaging shoe 32 is resiliently biased against the bottom of diaphragm 28 by a compression spring 34 seated between the lower surface of shoe 32 and a spring seat member 36. A valve operating stem 38 is secured to shoe 32 and is slideably guided within a bore 40 in block 14 for vertical reciprocatory movement, an O ring seal 42 blocking communication between chamber 30 and the chamber at the lower portion of block 14. A second port 44 is bored and tapped in block 14 to communicate with chamber 30 below diaphragm 28.

Stem 38 projects downwardly through bore 40 in block 14 and projects into an enlarged chamber 46 cooperatively defined by mating bores in the lower portion of block 14 and the upper portion of block 16. A passage 48 extends downwardly through block 16 to open at its lower end into a second chamber 50 formed in the lower end of block 16.

At the upper end of passage 48, a valve head 52 is slideably received within the upper end of passage 48 and normally biased to the open position shown in FIG. 1 by a valve spring 54. Valve head 52 is slideably supported in passage 48 by a fluted stem 56 which affords free communication between chamber 46 and passage 48 when valve head 52 is in the FIG. 1 position. A third port 58 is drilled and tapped in block 16 to communicate with chamber 46.

At the lower end of passage 48, a second valve head 60 is constructed with a fluted stem 62 slideably received within the lower end of passage 48. A spring 64 normally biases valve head 60 to the FIG. 1 position while the lower end of valve head 60 is engaged against a flexible diaphragm 66 which forms the lower wall of chamber 50. A fourth port 68 communicates with chamber 50.

Lower block 18 is formed with a tapped port 70 which communicates with an internal passage 72 in block 18. Passage 72 opens into a chamber 74 formed in the upper portion of block 18, the upper wall of chamber 74 being defined by flexible diaphragm 66.

From an inspection of FIG. 1, it is believed apparent that valve head 52 can be moved into seated engagement against its valve seat when diaphragm 28 is flexed downwardly, as by the supply of sufficient pressure to port 22. The strength of spring 54 is selected to be such that valve head 52 can be maintained on its seat only when diaphragm 28 is flexed downwardly. Although valve head 52 is not mechanically secured to valve stem 38, spring 54 is strong enough to open valve 52 against a pressure differential across the seated valve head corresponding to maximum operating pressure in chamber 46 and minimum pressure in passage 48, assuming diaphragm 28 to be in the FIG. 1 position.

*Engine safety control system of FIG. 2*

The control system of FIG. 2 includes a combination relay designated generally 100, a first group of condition responsive monitoring devices 102 and a second pair of condition monitoring devices 104. Each of the condition monitoring devices includes a transmitter relay 106 and a receiver relay 108, the transmitter relay 106 being described in detail in a copending application of myself and Joseph P. Wagner, Serial No. 89,492, filed February 15, 1961 and which has matured into U.S. Patent No. 3,116,905, and receiver relay 108 being described in detail in a copending application of Joseph P. Wagner, Serial No. 89,429, filed February 15, 1961 and which has matured into U.S. Patent 3,129,722, both of the last mentioned applications being assigned to the assignee of this application. Condition monitoring devices 102 and 104 differ only in function, devices 102 being employed to monitor various engine operating or "Class A" condition, while devices 104 are employed to monitor engine driven functions or "Class B" functions.

Typical Class A functions include engine bearing temperatures or engine vibration and substantially all Class A functions are in a safe operating range when the engine is stopped. Class B functions, on the other hand, reach their normal operating range only when the engine is up to speed and hence most Class B functions are in an "unsafe" or abnormal condition when the engine is stopped. The function of each of condition monitoring devices 102 and 104 is to maintain pressure in a portion of the system in a fashion described in greater detail below when the condition which it is monitoring is in a safe or normal range and to vent its portion of the circuit when the monitored condition is in a unsafe or abnormal range. Thus, during the starting of the engine, before the engine comes up to speed, the Class B conditions monitored by devices 104 will not be within their normal range and devices 104 will therefore indicate an unsafe condition. To prevent devices 104 from functioning to stop operation of the system, the starting lockout relay of FIG. 1 is connected in the circuit of FIG. 2 at the indicated location.

In addition to the various components described above, the system of FIG. 2 includes a source of air under pressure designated generally 110, an engine fuel supply 112 and a starting air supply 114. Air supply 110 is connected to combination relay 100 by a conduit 116 and a branch conduit 118, a manually operable reset valve 120 being connected in conduit 116 between air supply 110 and branch line 118. Reset valve 120 is a three-way valve which is manually operable in one position to connect supply 110 to combination relay 100 or alternatively operative in a second position to vent relay 100 while blocking communication from supply 110.

Engine fuel supply 112 is connected to engine 122 via conduit 124 in which is connected a diaphragm actuated three-way safety fuel valve 128 which is controlled, in a manner to be described in more detail below, by combination relay 100, relay 100 being connected to the diaphragm of valve 128 via conduits 130, 270, 272, 278 and 284. The connections of valve 128 are such that when no pressure is supplied via conduit 130 etc. to the diaphragm of valve 128, conduit 124 is blocked to prevent the flow of fuel from supply 112 into valve 128 while that portion of conduit 124 between valve 128 and engine 122 is vented. When pressure is supplied through conduit 130 to the diaphragm of valve 128, its venting port is closed and conduit 124 is opened to permit the flow of fuel from supply 112 to engine 122.

Engine 122 is provided with a pneumatically operated engine starter designated generally 132, air from the operation of starter 132 being supplied from starting air supply 114 through conduit 134 which is controlled by a diaphragm actuated three-way valve 288 similar in structure and function to valve 128. When pressure is supplied to the diaphragm of valve 288 via conduit 286, which is controlled by a manually operable starting valve 136, valve 288 connects supply 114 to engine starter 132. When the diaphragm of valve 288 is vented, valve 288 is shifted so that the starting air supply is blocked while that portion of conduit 134 to the right of valve 288 is vented at valve 288.

The various circuit connections are best understood in terms of the operation of the system. With the engine stopped and valves 120, 128, 136 and 288 in their blocking positions, the initial step in placing the system in operation is to manually open valve 120 to place the control system air supply 110 in communication with combination relay 100 via conduits 116 and 118. Air under pressure flows to combination relay 100 at ports 140 and 142. Flow of air under pressure into relay 100 from port 140 is blocked within combination relay 100 at a master relay 144. Master relay 144 is a diaphragm actuated three-way valve which is operable to selectively connect an internal passage 146 either to pressure supply port 140 or to a combination relay vent port 148. At this time, no pressure has been supplied to the master relay operating diaphragm 150 and relay 144 is positioned with passage 146 connected to vent port 148. When pressure is supplied to diaphragm 150, master relay 144 shifts to block vent port 148 and connect port 140 to passage 146.

Air under pressure does, however, flow into master relay 100 from port 142 through a pulse relay 152 into an internal passage 154. Pulse relay 152 is a diaphragm actuated two-way valve which is either opened to connect port 142 to passage 154 or is closed. Relay 152 is open when no pressure is applied to its actuating diaphragm 156. At this time no pressure has been supplied to diaphragm 156.

Air under pressure flows from conduit 154 via conduit 158 through a branch conduit 166, past a one-way check valve 168 and into a conduit 170 which is in communication with a port 172 in combination relay 100. From port 172, air under pressure flows through a conduit 174 which is connected to a pressure supply manifold conduit 176 commonly connected to the supply ports 178 of all of the receiver relays 108 in the various condition responsive control devices.

Air under pressure from manifold 176 also flows through a conduit 250 which is connected to port 22 of starting lockout relay 10. Referring briefly to FIG. 1, the supply of air to port 22 actuates diaphragm 28 to move valve head 52 to its seat, thereby blocking port 58 of lockout relay 10 from passage 48.

Returning now to FIG. 2, conduit 158 is also in communication with vent port 148 via conduit 184, however, a restricted orifice 186 in conduit 184 provides a sufficient restriction to maintain pressure in conduits 154, 158, etc. as long as pressure is supplied directly from source 110 to conduit 154 via the open pulse relay 152.

Referring now to condition monitoring devices 102 and 104, all of these devices are essentially similar in structure and operation and differ solely in the function which they monitor. Each device, as described above, includes a transmitter relay 106 which is in the form of a pressure operated two-way valve operable either, referring to the uppermost device 102, to close or to vent a conduit 188 connected to the transmitter port 190 of the associated receiver relay 108. Assuming that the uppermost condition responsive device 102 of FIG. 3 is set to monitor a Class A condition such as engine bearing temperature, the condition responsive element 192 is connected to transfer relay 106 in a fashion such that when the temperature of the monitored bearing is within a safe range, transmitter relay 106 is closed to block the end of conduit 188. If the engine bearing temperature should increase above a safe limit, condition responsive element 192 is operable to apply pressure to the diaphragm of transmitter relay 106 to open the valve and vent conduit 188. In the specific instance of a high temperature monitoring system, the condition responsive element may take the form of a well known bulb filled with a thermally responsive fluid which, upon heating to an undesired temperature, will expand and exert a pressure sufficient to actuate relay 106.

With pressure supplied via manifold 176 to the supply port 178 of receiver relay 108, port 178 is in communication with transmitter port 190 via an internal passage 194 having restricted orifice 196 connected in the passage. Conduit 194 communicates with the diaphragm 198 of a three-way valve 200 in receiver relay 108, the three-way valve 200 functioning to selectively connect the transmitter relay control port 202 either to vent port 204 or to supply port 178. When no pressure is exerted on diaphragm 198, control port 202 is connected to vent port 204.

Thus, if transmitter relay 106 is closed by virtue of the existence of a safe condition in the condition which its sensing element 192 is monitoring, the supply of pressure from combination relay 100 through manifold 176 to supply port 178 permits pressure to build up within conduit 194 and thus apply pressure to diaphragm 198 of receiver 108 to thereby shift the connection of three-way valve 200 to connect supply port 178 to control port 202 while closing vent port 204. A one-way check valve 206 is connected to control port 202 and seats in a direction away from control port 202 so that pressure cannot flow from control port 202 into conduit 208, but permitting pressure to flow from conduit 210–208 to vent port 204 when the monitoring device is actuated by an unsafe condition.

A similar action occurs at the next or other Class A condition monitoring device 102 because, with the engine not yet in operation, the engine operating condition which the second Class A monitoring device is responsive to is in a safe condition.

With valve 52 of lockout relay 10 closed, as described above and with the vent ports 204 of both receiver relays 108 associated with Class A condition responsive devices 102 closed, pressure (from conduits 166, 170) can build up in conduit 210 which is connected to a port 212 of combination relay 100 and also to port 58 of lockout relay 10. Pressure is supplied to conduit 210 from conduit 170, a restricted orifice 214 slowing the flow of pressure from conduit 170 into conduit 210 to minimize the pressure in conduit 210 until valve 52 has been closed by pressure supplied through the unrestricted path from conduit 170 to port 22 of lockout relay 10 via 174–176–250. Communication between port 58 and passage 48 of lockout relay 10 is prevented at this time because the supply of pressure to port 22 of the lockout relay (via conduits 250, 176, 174, etc.) has previously closed valve head 52 of the lockout relay.

Closure of valve head 52 blocks communication between conduit 210, which is connected to the Class A device control ports 202, and conduit section 210B which is connected to the Class B device control ports 202. Because the engine has not yet been started, the Class B devices 104 have their control ports 202 connected to their vent ports 204.

Conduit 210B is connected to conduit 210 via passage 48 of lockout relay 10 when both of valves 52 and 60 are open and in order to isolate the Class B devices from the control system it is necessary to maintain one of valves 52 and 60 closed until the Class B conditions move into their safe range as the engine comes up to speed.

With valve 52 closed, pressure can build up in conduit 210, this pressure being supplied from conduit 170 via port 212 in combination relay 100. Building up of pressure at port 212 pressurizes the diaphragm 150 of master relay 144 in combination relay 100 via an internal passage 216 and, when diaphragm 150 is pressurized, it shifts the connection of the master relay 144 to connect port 140 to conduit 146 while blocking vent port 148.

The shifting of master relay 144 provides a direct connection from port 140 to conduit 146 and pressure flows from conduit 146 to conduits 218 and 130. The supply of pressure to conduit 218 pressurizes the diaphragm 156 of pulse relay 152 and causes this relay to close, thereby blocking communication between pressure supply port 142 of combination relay 100 and conduit 154. Pulse relay 152 is so constructed that once closed, the valve is maintained closed by pressure exerted at port 142. Thus, in order to restore pulse relay 152 to its original open position, it is necessary to vent port 142 by manually actuating reset valve 120. This assures that in the event of a failure induced shutdown of the system, the system cannot be automatically restarted, but requires a manual operation.

Closing of pulse relay 152 and the subsequent loss of pressure to conduit 154 permits conduits 154, 158 and 166 to vent via passage 184 and retricted orifice 186 which are in communication with combination relay vent port 148.

Conduit 170 is not connected to vent by this action because one-way check valve 168 prevents the reverse flow of pressure back through valve 168 into passage 166. Thus, pressure is maintained at conduit 170.

As stated above, the shifting of master relay 144 supplies pressure from port 140 via conduit 146 to conduit 130. Conduit 130 is connected to the supply port 252 of a starting relay 254 which may take the form of the relay described in a copending application of myself and Joseph P. Wagner, Serial No. 112,387, filed May 24, 1961, and assigned to the assignee of this application and which has matured into U.S. Patent No. 3,107,693. Relay 254 is provided with a vent port 256, an outlet port 258 and a fourth port 260. As was the case with receiver relay 108, starting relay 254 functions to selectively connect outlet port 258 either to vent port 256 or to inlet port 252. When pressure is supplied to port 260 to pressurize the diaphragm of relay 254, the pressurized diaphragm manipulates the relay to connect port 252 to port 258. When pressure is lost above the diaphragm, relay 254 connects port 258 to port 256 while blocking port 252. Pressure may be supplied to port 260 from conduit 130 by the depression of a start button 262 which places conduit 264 and port 260 in communication with conduit 130. Start button 262 need be depressed only momentarily, because once communication is established between ports 252 and 258, a bypass passage 266 within relay 254 is operable to supply pressure to the top of the relay diaphragm via a restricted orifice 268.

With pressure supplied to port 258, conduit 270 conducts air under pressure to a manually operable starting air valve 136. Valve 136 has not yet been manually opened and pressure from conduit 270 flows through a conduit 272 to a manual ignition valve 274 which is closed at this time.

Upon the opening of valve 136, pressure can flow from conduit 270 through valve 136 into conduit 286 to pressurize the diaphragm of starting air valve 288. When the diaphragm of valve 288 is pressurized, it connects the starting air supply 114 to engine starter 132 via conduit 134. Air is tapped from conduit 134 via a conduit 220 which includes a pressure regulating valve 222 and a throttling device 224, and pressure is conducted through conduit 220 to port 70 of lockout relay 10. Pressure supplied at port 70 shifts valve 60 of lockout relay 10 to its closed position thus blocking communication between lockout relay port 68 and passage 48.

Valve 274 is then opened to conduct air under pressure from conduit 270 into conduits 276 and 278. Conduit 276 supplies pressure to a pressure operated electrical switch 280 which functions as the ignition contacts for engine 122.

Conduit 278 is connected to one port of a manually operable three-way valve 282 which is operable to selectively connect a conduit 284 either to vent or to conduit 278. Conduit 284 is connected to the diaphragm of safety fuel control valve 128 and when pressure is supplied to conduit 284, valve 128 will connect fuel supply 112 to engine 122. Operation of valve 282 to connect conduit 284 to vent will discontinue the flow of fuel to engine 122 by venting the diaphragm of safety fuel valve 128.

Conduit 284 is extended beyond its connection to safety fuel valve 128 and is connected to port 44 of lockout relay 10. When pressure is supplied to conduit 284 to connect fuel supply 112 to engine 122, the pressure in conduit 284 is likewise conducted to port 44 of lockout relay 10. The supply of pressure to port 44 restores upper diaphragm 28 of lockout relay 10 to its original position, and valve 52 opens. However, communication between conduit 210B and conduit 210 is still blocked because valve 60 was closed by pressure from starter air supply 114.

With air being supplied to engine starter 132 to turn engine 122 over and with both fuel and ignition on, the engine starts and begins to come up to speed. Upon starting of the engine, valve 136 is manually closed to discontinue the supply of pressure to starting air valve 288. Closing of valve 136 vents conduit 286 to permit the diaphragm of valve 288 to return to its original position, and this action in turn vents conduits 134 and 220. The rate at which pressure is lost from port 70 of lockout relay 10 through conduit 220 is controlled by the throttling device 224 which delays loss of pressure at port 70 until the engine has come to speed, thereby delaying the opening of valve 60 until the Class B condition responsive devices 104 have been moved into their safe range and closed the various venting ports 204 in Class B devices 104.

When pressure is lost finally at port 70, lower diaphragm 66 of lockout relay 10 returns to its original position, opening valve 60. With the opening of valve 60, conduits 210 and 210B are placed in communication with each other and a failure or movement of any monitored Class A or Class B condition into an abnormal or unsafe range will stop operation of the system by connecting conduits 210 either directly or via conduit 210B to the vent port 204 of whichever monitoring device senses an unsafe condition. Venting of conduit 210 vents the diaphragm 150 of master relay 144, causing relay 144 to shift to connect conduit 130 to vent port 148. Loss of pressure in conduit 130 will cause starting relay 254 to shift by virtue of the loss of pressure in bypass conduit 266, thereby connecting port 258 to vent port 256 to vent conduits 270, 276, thereby closing ignition switch 280 and also venting conduit 278 to actuate safety fuel valve 128 to stop the flow of fuel to engine 122.

The system of FIG. 2 permits the manual stopping of the engine by the operator without the requirement of unloading combination relay 100. During normal operation of the system of FIG. 2, pressure is continuously supplied via port 22 to diaphragm 28 of the lockout relay and this pressure above diaphragm 28 is counterbalanced by the pressure in conduit 284, which holds the safety fuel control valve 128 in its open position. With the pressure on both sides of diaphragm 28 equalized, return spring 34 provides the force which maintains diaphragm 28 in its upper position as shown in FIG. 1 and valve head 52 is held open by spring 54.

In the event the operator wishes to stop operation of the engine, he depresses stop button 290 which vents conduit 264, thereby venting pressure from the diaphragm of starting lockout relay 254. The venting of pressure from the diaphragm of relay 254 causes the lockout relay to shift to block port 252 and connect port 258 to vent port 256. It will be noted that this action maintains full pressure in conduit 130, thereby maintaining combination relay 100 in operative condition. Venting of conduit 258 vents the ignition switch 280, and also vents the diaphragm above safety fuel control valve 128 to stop engine 122. Venting of conduit 284 also connects port 44 of lockout relay 10 to vent, thereby venting the pressure beneath diaphragm 28 to permit the diaphragm to flex downwardly to drive valve 52 to its closed position.

The closing of valve 52 isolates conduit 210B and the Class B condition monitoring devices to prevent venting combination relay 100 at port 212 as the Class B functions move into their abnormal range as engine 122 moves to a dead stop. The Class A condition responsive devices 102 are still effective at this time since the Class A functions will stay within their normal range when engine 122 is stopped.

To restart engine 122, the operator merely depresses start button 262 to again pressurize the diaphragm of relay 254 to shift the relay to connect port 252 to port 258 while blocking vent port 256. This shifting of relay 254 again supplies pressure to conduit 270 to pressurize the safety fuel valve, ignition switch 280 and port 44 of lockout relay 10, thereby restoring diaphragm 28 to its original condition and permitting the opening of valve 52. At the same time, starting air is supplied to engine starter 132 to effect starting of the engine in the fashion described above.

While I have described exemplary embodiments of my invention, it will be apparent to those skilled in the art that the disclosed embodiments may be modified. Therefore, the foregoing description is to be considered exemplary, rather than limiting, and the true scope of the invention is that defined in the following claims.

I claim:

1. A pneumatic lockout relay comprising a casing having a first internal chamber and a second internal chamber therein, and an internal passage in said casing opening at one end into said first chamber and opening at its other end into said second chamber, a valve head in each chamber movable into a seated position overlying the end of said passage opening into the chamber to block communication between the chamber and the passage and movable away from its seated position to an open position to place the chamber and passage in communication with each other, a first port in said casing communicating with said first chamber, a second port in said casing communicating with said second chamber, first pressure responsive means in said casing actuable to move the valve head in said first chamber to its seated position, second pressure responsive means in said casing operable when pressurized to move the valve head in said second chamber to its seated position, means for maintaining said valve head in said first chamber in its open position when said first pressure responsive means is in an unactuated condition, and second means for restoring the valve head in said second chamber to its open position, said first pressure-responsive means comprising means defining a third internal chamber in said casing, a first flexible diaphragm dividing said third chamber into a first and a second portion, a third port in said casing communicating with the first portion of said third chamber, and a valve actuating stem operable by said first diaphragm and engageable with the valve in said first chamber to move the first chamber valve head to its seated position when said first portion of said third chamber is pressurized.

2. A pneumatic lockout relay as defined in claim 1 further comprising a fourth port connected to said second portion of said third chamber, said second pressure responsive means comprising a second flexible diaphragm defining one side of said second chamber and engageable with the valve head in said second chamber, and a fifth port in said casing communicating with the side of said second diaphragm remote from said second chamber for applying pressure thereto to flex said second diaphragm in a direction moving the valve head in said second chamber to its seated position.

3. In combination with a pressure source and a pneumatic lockout relay as defined in claim 2 wherein all ports of said lockout relay are selectively connectable to said pressure source, the further improvement wherein said first means for restoring said valve head in said first chamber to its open position comprises spring means resiliently biasing said valve actuating stem in a direction away from said valve head in said first chamber, the biasing force of said spring means being less than the force exerted on said first diaphragm when said third port is connected to said pressure source, said spring means being operable to move said valve stem to a position permitting said valve head in said first chamber to move to its open position when the pressure at said third and said fourth ports is equalized, and a return spring engaged with said valve head in said first chamber for maintaining said valve head in contact with said valve actuating stem, said return spring exerting a biasing force sufficient to overcome the pressure differential across said valve head in said first chamber when said first port is connected to said pressure source and said valve head in said first chamber is in said seated position.

References Cited by the Examiner

UNITED STATES PATENTS

| | | | |
|---|---|---|---|
| 2,552,226 | 5/51 | Singer | 137—614.21 |
| 2,693,823 | 11/54 | Sogge | 137—614.21 |
| 2,874,711 | 2/59 | Anxionnaz | 137—26 |
| 2,981,271 | 4/61 | Cowles | 137—26 |

ISADOR WEIL, *Primary Examiner.*

CLARENCE R. GORDON, *Examiner.*